US008163263B2

(12) United States Patent
Harutyunyan et al.

(10) Patent No.: US 8,163,263 B2
(45) Date of Patent: Apr. 24, 2012

(54) CATALYST FOR THE GROWTH OF CARBON SINGLE-WALLED NANOTUBES (75) Inventors: Avetik R. Harutyunyan, Columbus, OH (US); Toshio Tokune, Columbus, OH (US); Elena Mora, Columbus, OH (US)

(73) Assignees: Honda Motor Co., Ltd., Tokyo (JP); The Ohio State University Research Foundation, Columbus, OH (US)

( * ) Notice: Subject to any disclaimer, the term of this patent is extended or adjusted under 35 U.S.C. 154(b) by 489 days.

(21) Appl. No.: 11/669,128

(22) Filed: Jan. 30, 2007

(65) Prior Publication Data
US 2007/0281087 A1 Dec. 6, 2007

Related U.S. Application Data (60) Provisional application No. 60/763,943, filed on Jan. 30, 2006.

(51) Int. Cl.
*D01F 9/12* (2006.01)
(52) U.S. Cl. .................................. 423/447.3; 977/843
(58) Field of Classification Search ............... 423/447.3; 977/843
See application file for complete search history.

(56) References Cited

U.S. PATENT DOCUMENTS

| | | | |
|---|---|---|---|
| 5,165,909 A | 11/1992 | Tennent et al. | |
| 5,424,054 A | 6/1995 | Bethune et al. | |
| 5,618,475 A | 4/1997 | Johnson et al. | |
| 5,665,277 A | 9/1997 | Johnson et al. | |
| 5,759,230 A | 6/1998 | Chow et al. | |
| 5,783,263 A | 7/1998 | Majetich et al. | |
| 6,401,526 B1 | 6/2002 | Dai et al. | |
| 6,436,167 B1 | 8/2002 | Chow et al. | |
| 6,730,284 B2 | 5/2004 | Harutyunyan et al. | |
| 6,764,874 B1 | 7/2004 | Zhang et al. | |
| 6,974,492 B2 | 12/2005 | Harutyunyan et al. | |
| 2002/0017884 A1 | 2/2002 | Ishida | |
| 2003/0180461 A1* | 9/2003 | Hwang et al. | 427/249.1 |
| 2003/0207326 A1 | 11/2003 | Su et al. | |
| 2004/0005269 A1 | 1/2004 | Huang et al. | |
| 2004/0040834 A1 | 3/2004 | Smalley et al. | |
| 2004/0099208 A1 | 5/2004 | Kang et al. | |
| 2004/0101467 A1 | 5/2004 | Harutyunyan et al. | |
| 2005/0123467 A1 | 6/2005 | Harutyunyan | |
| 2005/0230356 A1 | 10/2005 | Empedocles et al. | |
| 2006/0025515 A1 | 2/2006 | Scaringe et al. | |
| 2007/0041886 A1* | 2/2007 | Ishida et al. | 423/447.1 |
| 2008/0279753 A1 | 11/2008 | Harutyunyan | |

FOREIGN PATENT DOCUMENTS

| | | |
|---|---|---|
| JP | S53-91054 | 8/1978 |
| JP | S56-136904 | 10/1981 |
| JP | S61-69906 | 4/1986 |
| JP | 11-246901 | 9/1999 |
| JP | H11-293308 | 10/1999 |
| JP | 2001-254109 | 9/2001 |
| JP | 2002-255519 | 9/2002 |
| WO | WO 01/49599 | 7/2001 |

OTHER PUBLICATIONS

Homma, J. Phys. Chem. B, vol. 107, No. 44, 2003, p. 12161-4.*
Laplaze, D. Carbon, 40 (2002), 1621-1634.*
Baughman, Ray H. et al, "Carbon Nanotubes—the Route Toward Applications" Science, Aug. 2, 2002, pp. 787-792.
Bladh K. et al., "On the Iron-Catalysed Growth of the Single-Walled Carbon Nanotubes and Encapsulated Metal Particles in the Gas Phase," Applied Physics A, Materials Science & Processing, Mar. 1, 2000, pp. 317-322, Springer-Verlag, Published Online.
Burns, P. et al, "Emulsion/Aggregation Technology: A Process for Preparing Microspheres of Narrow Polydispersity", Proc. Of Fourth Int'l Conf. on Scientific & Clinical Applications of Magnetic Carriers, May 9-11, 2002, Tallahassee, FL, pp. 162-164.
Cheung, C.L. et al., "Diameter-Controlled Synthesis of Carbon Nanotubes", J. Phys. Chem. B., vol. 106, No. 10, 2002, pp. 2429-2433.
Cui, H. et al, "Growth Behavior of Carbon Nanotubes on Multilayered Metal Catalyst Film in Chemical Vapor Deposition", Chemical Physics Letters, vol. 374, 2003, pp. 222-228.
Dai, H. et al, "Single-Wall Nanotubes Produced by Metal-Catalyzed Disproportionation of Carbon Monoxide", Chemical Physics Letters, Sep. 27, 1996, vol. 260, 1996, pp. 471-475, Elsevier.
Dresselhaus, M.S. et al, "Raman Scattering in Carbon Materials", Analytical Applications of Raman Spectroscopy, Chapter 9, 1999, pp. 367-434.
Dubrovinsky, L. et al., "Pressure Induced Invar Effect in Fe-Ni Alloys", Phys. Rev. Lett., vol. 86, No. 21, May 21, 2000, pp. 4851-4854.
Dupuis, A., "The Catalyst in the CCVD of Carbon Nanotubes—A Review", Progress in Materials Science, vol. 50, 2005, pp. 929-961.
Fu, L. et al., "Synthesis & Patterning of Magnetic Nanostructures", Proc. Of Fourth Int'l Conf. on Scientific & Clinical Applications of Magnetic Carriers, May 9-11, 2002, Tallahassee, FL, pp. 170-171.

(Continued)

*Primary Examiner* — Stuart Hendrickson
(74) *Attorney, Agent, or Firm* — Fenwick & West LLP; Mark Duell (57) ABSTRACT

Methods and processes for synthesizing single-wall carbon nanotubes are provided. A carbon precursor gas is contacted with metal catalysts deposited on a support material. The metal catalysts are preferably nanoparticles having diameters less than about 3 nm. The reaction temperature is selected such that it is near the eutectic point of the mixture of metal catalyst particles and carbon. Further, the rate at which hydrocarbons are fed into the reactor is equivalent to the rate at which the hydrocarbons react for given synthesis temperature. The methods produce carbon single-walled nanotubes having longer lengths.

15 Claims, 3 Drawing Sheets

OTHER PUBLICATIONS

Gotic, M. et al., Formation of Nanocrystalline NiFe$_2$O$_4$, Philos. Mag. Lett., vol. 78, No. 3, Sep. 1998, pp. 193-201.

Hafner, Jason H. et al., "Catalytic Growth of Single-Wall Carbon Nanotubes from Metal Particles," Chemcial Physics Letters, Sep. 27, 1996, pp. 195-202, Elsevier.

Harutyunyan, A. et al, "CVD Synthesis of Single Wall Carbon Nanotubes Under "Soft" Conditions", NANO Letters, vol. 2, No. 5, 2002, pp. 525-530.

Harutyunyan, A. et al, "Liquid as a Required Catalyst Phase for Carbon Single-Walled nanotube Growth", Applied Physics Letters, vol. 87, 2005, pp. 87-89.

Hernadi, K. et al., "Carbon Nanotubes Production over Co/Silica Catalysts," Catalysis Letters, pp. 229-238, J.C. Baltzer AG.

Hornyak, G.L., "A Temperature Window for Chemical Vapor Decomposition Growth of Single-Wall Carbon Nanotubes", J. Phys. Chem. B., vol. 106, Feb. 2002, pp. 2821-2825.

Kanzow, H. et al, "Formation Mechanism of Single-Wall Carbon Nanotubes on Liquid-Metal Particles", Physical Review B, vol. 60, No. 15, Oct. 15, 1999, pp. 180-186.

Kodama, R.H., "Magnetic Nanoparticles", J Magnetism & Magnetic Mat., vol. 200, 1999, pp. 359-372.

Lei, An et al., "Synthesis of Nearly Uniform Single-Walled Carbon Nanotubes Using Identical Metal-Containing Molecular Nanoclusters as Catalysts," JACS Communications, pp. 13688-13689, Oct. 26, 2002, Published on the Web.

Moisala, A. et al, "The Role of Metal Nanoparticles in the Catalytic Production of Single-Walled Carbon Nanotubes—A Review", Journal of Physics: Condensed Matter, 2003, pp. S3011-S3035, U.K.

Nieuwenhuys, G.J., "Magnetic Behavior of Cobalt, Iron and Manganese Dissolved in Palladium", Adv. In Phys., vol. 24, No. 4, Jul. 1975, pp. 515-591.

Oswald, A. et al., "Giant Moments in Palladium", Physical Review Letters, vol. 56, No. 13, Mar. 31, 1986, pp. 1419-1422.

Pannaparayil, T. et al, "A Novel Low-Temperature Preparation of Several Ferrimagnetic Spinels and Their Magnetic and Mossbauer Characterization", J. Appl. Phys., vol. 64, No. 10, Nov. 15, 1988, pp. 5641-5643.

Prasad, S. et al, "Magnetic Studies of Nanosized Nickel Ferrite Particles Synthesized by the Citrate Precursor Technique", J. Alloys & Compounds, vol. 265, 198, pp. 87-92.

Puntes, V.F. et al., "Tuning the SP (superparamagnetic) to FM (ferromagnetic) Transition of Cobalt Nanoparticles in View of Biomedical Applications", Proc. Of Fourth Int'l Conf. on Scientific & Clinical Applications of Magnetic Carriers, May 9-11, 2002, Tallahassee, FL, pp. 143-146.

Suslov, A., "Synthesis of Magnetic Cluster Nanoparticles", Proc. Of Fourth Int'l Conf. on Scientific & Clinical Applications of Magnetic Carriers, May 9-11, 2002, Tallahassee, FL, pp. 214-216.

Wang, Y.F. et al, "Graphical Method for Assigning Raman Peaks of Radial Breathing Modes of Single-Wall Carbon Nanotubes", Chem. Phys. Letters, vol. 336, 2001, pp. 47-52.

Wilson, K.S., "A Generalized Method for Magnetite Nanoparticle Steric Stabilization Utilizing Block Copolymers Containing Carboxylic Acids", Proc. Of Fourth Int'l Conf. on Scientific & Clinical Applications of Magnetic Carriers, May 9-11, 2002, Tallahassee, FL, pp. 220-223.

Zaluska, A. et al, "Nanocrystalline Magnesium for Hydrogen Storage", J. Alloys & Compounds, vol. 288, 1999, pp. 217-225.

Ziolo, R.F., "Matrix-Mediated Synthesis of Nanocrystalline gamma-Fe$_2$O$_3$: A New Optically Transparent Magnetic Material", Science, vol. 257, Jul. 10, 1992, pp. 219-223.

PCT International Search Report and Written Opinion, PCT/US07/02586, Aug. 18, 2008.

Bethune, D.S. et al, "Cobalt-catalysed growth of carbon nanotubes with single-atomic-layer walls," Nature, Jun. 17, 1993, pp. 605-607, vol. 363, No. 6430.

Cheng, H.M. et al., "Large-scale and low-cost synthesis of single-walled carbon nanotubes by the catalytic pyrolysis of hydrocarbons," Applied Physics Letters, Jun. 22, 1998, pp. 3282-3284, vol. 72, No. 25.

Ci, L. et al., "Preparation of carbon nanofibers by the floating catalyst method" Carbon, 2000, pp. 1933-1937, vol. 38, No. 14.

Dai, H. et al., "Single-wall nanotubes produced by metal-catalyzed disproportionation of carbon monoxide," Chemical Physics Letters, Sep. 27, 1996, pp. 471-475, vol. 260.

Ivanov, V. et al., "The study of carbon nanotubes produced by catalytic method," Chemical Physics Letters, Jun. 24, 1994, pp. 329-335, vol. 223.

Journet, C. et al., "Large-scale production of single-walled nanotubes by the electric-arc technique," Nature, Aug. 21, 1997, pp. 756-758, vol. 388.

Li, W.Z. et al., "Large-Scale Synthesis of Aligned Carbon Nanotubes," Science, Dec. 6, 1996, pp. 1701-1703, vol. 274.

Lijima, S. et al., "Single-shell carbon nanotubes of 1-nm diameter," Nature, Jun. 17, 1993, pp. 603-605, vol. 363, No. 6430.

PCT International Search Report and Written Opinion, PCT Application No. PCT/US 2007/02513, Feb. 22, 2008, 8 pages.

Reed-Hill, R., "Physical Metallurgy Principles," 1992, pp. 419 and 589.

Saito, Y. et al., "Extrusion of single-wall carbon nanotubes via formation of small particles condensed near an arc evaporation source," Chemical Physics Letters, Apr. 21, 1995, pp. 419-426, vol. 236.

Thess, A. et al. "Crystalline Ropes of Metallic Carbon Nanotubes," Science, Jul. 26, 1996, pp. 483-487, vol. 273.

* cited by examiner

CATALYST FOR THE GROWTH OF CARBON SINGLE-WALLED NANOTUBES

RELATED APPLICATIONS

This application claims priority to and the benefit of U.S. Provisional Application 60/763,943, filed on Jan. 30, 2006, which is incorporated by reference herein in its entirety.

FIELD OF INVENTION

The present invention relates to methods for the preparation (synthesis) of carbon single-walled nanotubes using chemical vapor deposition method.

INTRODUCTION

Catalyst features are of central importance for carbon single-walled nanotubes growth. Combination of catalyst activity and the melting point evolution during nanotube growth, with Raman studies bolster the "V"-shape behavior of the nanocatalyst-carbon binary phase liquidus line as a critical feature. In fact, the "L"-shape is the ideal feature, which implies low activation energy of diffusion, high carbon solubility, excludes the carbide formation and, thereby possess long "lifetime" for nanotube growth. For the catalyst with diameter less than 1.2 nm the choice of support material may results significant modification of features. The catalyst features and corresponding synthesis parameters required for nanotube growth are presented.

The elucidation of catalyst particle specific features favorable for carbon single-walled nanotubes (SWNTs) growth will help to control over the characteristics of grown nanotubes and eventually will promote exploitation of their unique properties (R. H. Baughman, A. A. Zakhidov, W. A. De Heer, Science 297, 787 (2002)). There are a large number of studies regarding the influence of catalyst composition on SWNTs growth, where most often 3d metals and their combinations have been considered (K. B. K. Teo, C. Singh, M. Chhowalla, W. I. Milne, Encyclopedia of Nanoscience and Nanotechnology X, 1-22, (2003), A-C. Dupuis, Prog. In Materials Science 50, 929-961 (2005)). It is already established that catalyst preparation methods, pretreatments, diameters, crystallographic and electronic structures, and abilities of carbide and oxide formations also have remarkable influence on nanotube growth (A-C. Dupuis, Prog. In Materials Science 50, 929-961 (2005)). These studies are extended by reports about the essential role of catalyst-supports coupling (more common supports Al, Zr, Mg, Si based oxides). In addition, the synthesis parameters have a crucial impact on the thermodynamics and kinetics of the growth (A-C. Dupuis, Prog. In Materials Science 50, 929-961 (2005)). Nevertheless, intense research to reveal the common features of the catalysts favorable for nanotube growth from described complexity is still underway. We have undertaken a systematic in-situ parametrical study of the catalyst activity evolution during nanotubes growth, by using an enhanced synthesis CVD technique. We show that, by combining the results with differential scanning calorimetry (DSC) and Raman spectroscopy studies, it is possible to elucidate the hidden common features of catalysts responsible for nanotube growth and their relationship with synthesis parameters and, AS A RESULT, TO PREDICT THE FEATURES FOR THE IDEAL CATALYST.

SUMMARY

The present invention provides methods and processes for growing single-wall carbon nanotubes. In one aspect, a carbon precursor gas and metal catalysts on supports are heated to a reaction temperature near the eutectic point (liquid phase) of the metal-carbon phase. Further, the reaction temperature is below the melting point of the metal catalysts.

DESCRIPTION OF THE INVENTION

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, New York.

The terms "single-walled carbon nanotube" or "one-dimensional carbon nanotube" are used interchangeable and refer to cylindrically shaped thin sheet of carbon atoms having a wall consisting essentially of a single layer of carbon atoms, and arranged in an hexagonal crystalline structure with a graphitic type of bonding.

The term "multi-walled carbon nanotube" as used herein refers to a nanotube composed of more than one concentric tubes.

The terms "metalorganic" or "organometallic" are used interchangeably and refer to co-ordination compounds of organic compounds and a metal, a transition metal or metal halide.

The term "eutectic point" refers to the lowest possible temperature of solidification for an alloy, and can be lower than that of any other alloy composed of the same constituents in different proportions.

The catalyst composition may be any catalyst composition known to those of skill in the art that is routinely used in chemical vapor deposition processes. The function of the catalyst in the carbon nanotube growth process is to decompose the carbon precursors and aid the deposition of ordered carbon. The method, processes, and apparatuses of the present invention preferably use metal nanoparticles as the metallic catalyst. The metal or combination of metals selected as the catalyst can be processed to obtain the desired particle size and diameter distribution. The metal nanoparticles can then be separated by being supported on a material suitable for use as a support during synthesis of carbon nanotubes using the metal growth catalysts described below. As known in the art, the support can be used to separate the catalyst particles from each other thereby providing the catalyst materials with greater surface area in the catalyst composition. Such support materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by addition elements, are used as support powders. Silica, alumina and other materials known in the art may be used as support, preferably alumina is used as the support.

The metal catalyst can be selected from a Group V metal, such as V or Nb, and mixtures thereof, a Group VI metal including Cr, W, or Mo, and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Pt—Cr, Pt—W, and Pt—Mo. Preferably, the metal catalyst is iron, cobalt, nickel, molybdeum, or a mixture thereof, such as Fe—Mo, Co—Mo and Ni—Fe—Mo.

The metal, bimetal, or combination of metals are used to prepare metal nanoparticles having defined particle size and diameter distribution. The metal nanoparticles can be prepared using the literature procedure described in described in Harutyunyan et al., NanoLetters 2, 525 (2002). Alternatively, the catalyst nanoparticles can be prepared by thermal decomposition of the corresponding metal salt added to a passivating salt, and the temperature of the solvent adjusted to provide the metal nanoparticles, as described in the co-pending and co-owned U.S. patent application Ser. No. 10/304,316, or by any other method known in the art. The particle size and diameter of the metal nanoparticles can be controlled by using the appropriate concentration of metal in the passivating solvent and by controlling the length of time the reaction is allowed to proceed at the thermal decomposition temperature. Metal nanoparticles having particle size of about 0.01 nm to about 20 nm, more preferably about 0.1 nm to about 3 nm and most preferably about 0.3 nm to 2 nm can be prepared. The metal nanoparticles can thus have a particle size of 0.1, 1, 2, 3, 4, 5, 6, 7, 8, 9, or 10 nm, and up to about 20 nm. In another aspect, the metal nanoparticles can have a range of particle sizes. For example, the metal nanoparticles can have particle sizes in the range of about 3 nm and about 7 nm in size, about 5 nm and about 10 nm in size, or about 8 nm and about 16 nm in size. The metal nanoparticles can optionally have a diameter distribution of about 0.5 nm to about 20 nm, preferably about 1 nm to about 15 nm, more preferably about 1 nm to about 5 nm. Thus, the metal nanoparticles can have a diameter distribution of about 1, 2, 3, 4, 5, 6, 7, 8, 9, 10, 11, 12, 13, 14, or 15 nm.

The metal salt can be any salt of the metal, and can be selected such that the melting point of the metal salt is lower than the boiling point of the passivating solvent. Thus, the metal salt contains the metal ion and a counter ion, where the counter ion can be nitrate, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof The melting point of the metal salt is preferably about 5° C. to 50° C. lower than the boiling point, more preferably about 5° C. to about 20° C. lower than the boiling point of the passivating solvent.

The metal salt can be dissolved in a passivating solvent to give a solution, a suspension, or a dispersion. The solvent is preferably an organic solvent, and can be one in which the chosen metal salt is relatively soluble and stable, and where the solvent has a high enough vapor pressure that it can be easily evaporated under experimental conditions. The solvent can be an ether, such as a glycol ether, 2-(2-butoxyethoxy) ethanol, $H(OCH_2CH_2)_2O(CH_2)_3CH_3$, which will be referred to below using the common name dietheylene glycol mono-n-butyl ether, and the like.

The relative amounts of metal salt and passivating solvent are factors in controlling the size of nanoparticles produced. A wide range of molar ratios, here referring to total moles of metal salt per mole of passivating solvent, can be used for forming the metal nanoparticles. Typical molar ratios of metal salt to passivating solvent include ratios as low as about 0.0222 (1:45), or as high as about 2.0 (2:1), or any ratio in between. Thus, for example, about $5.75 \times 10^{-5}$ to about $1.73 \times 10^{-3}$ moles (10-300 mg) of $FeAc_2$ can be dissolved in about $3 \times 10^{-4}$ to about $3 \times 10^{-3}$ moles (50-500 ml) of diethylene glycol mono-n-butyl ether.

In another aspect, more than one metal salt can be added to the reaction vessel in order to form metal nanoparticles composed of two or more metals, where the counter ion can be the same or can be different. The relative amounts of each metal salt used can be a factor in controlling the composition of the resulting metal nanoparticles. For the bimetals, the molar ratio of the first metal salt to the second metal salt can be about 1:10 to about 10:1, preferably about 2:1 to about 1:2, or more preferably about 1.5:1 to about 1:1.5, or any ratio in between. Thus, for example, the molar ratio of iron acetate to nickel acetate can be 1:2, 1:1.5, 1.5:1, or 1:1. Those skilled in the art will recognize that other combinations of metal salts and other molar ratios of a first metal salt relative to a second metal salt may be used in order to synthesize metal nanoparticles with various compositions.

The passivating solvent and the metal salt reaction solution can be mixed to give a homogeneous solution, suspension, or dispersion. The reaction solution can be mixed using standard laboratory stirrers, mixtures, sonicators, and the like, optionally with heating. The homogenous mixture thus obtained can be subjected to thermal decomposition in order to form the metal nanoparticles.

The thermal decomposition reaction is started by heating the contents of the reaction vessel to a temperature above the melting point of at least one metal salt in the reaction vessel. Any suitable heat source may be used including standard laboratory heaters, such as a heating mantle, a hot plate, or a Bunsen burner, and the heating can be under reflux. The length of the thermal decomposition can be selected such that the desired size of the metal nanoparticles can be obtained. Typical reaction times can be from about 10 minutes to about 120 minutes, or any integer in between. The thermal decomposition reaction is stopped at the desired time by reducing the temperature of the contents of the reaction vessel to a temperature below the melting point of the metal salt.

The size and distribution of metal nanoparticles produced can be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

The metal nanoparticles, such as those formed by thermal decomposition described in detail above, can then be supported on solid supports. The solid support can be silica, alumina, MCM-41, MgO, $ZrO_2$, aluminum-stabilized magnesium oxide, zeolites, or other oxidic supports known in the art, and combinations thereof. For example, $Al_2O_3$—$SiO_2$ hybrid support could be used. Preferably, the support is aluminum oxide ($Al_2O_3$) or silica ($SiO_2$). The oxide used as solid support can be powdered thereby providing small particle sizes and large surface areas. The powdered oxide can preferably have a particle size between about 0.01 µm to about 100 µm, more preferably about 0.1 µm to about 10 µm, even more preferably about 0.5 µm to about 5 µm, and most preferably about 1 µm to about 2 µm. The powdered oxide can have a surface area of about 50 to about 1000 $m^2$/g, more preferably a surface area of about 200 to about 800 $m^2$/g. The powdered oxide can be freshly prepared or commercially available.

In one aspect, the metal nanoparticles are supported on solid supports via secondary dispersion and extraction. Secondary dispersion begins by introducing particles of a powdered oxide, such as aluminum oxide ($Al_2O_3$) or silica ($SiO_2$), into the reaction vessel after the thermal decomposition reaction. A suitable $Al_2O_3$ powder with 1-2 µm particle size and having a surface area of 300-500 $m^2$/g is commercially available from Alfa Aesar of Ward Hill, Mass., or Degussa, N.J. Powdered oxide can be added to achieve a desired weight ratio between the powdered oxide and the initial amount of metal used to form the metal nanoparticles. Typically, the weight ratio can be between about 10:1 and about 15:1. For example, if 100 mg of iron acetate is used as the starting material, then about 320 to 480 mg of powdered oxide can be introduced into the solution.

The mixture of powdered oxide and the metal nanoparticle/ passivating solvent mixture can be mixed to form a homogenous solution, suspension or dispersion. The homogenous solution, suspension or dispersion can be formed using sonicator, a standard laboratory stirrer, a mechanical mixer, or any other suitable method, optionally with heating. For example, the mixture of metal nanoparticles, powdered oxide, and passivating solvent can be first sonicated at roughly 80° C. for 2 hours, and then sonicated and mixed with a laboratory stirrer at 80° C. for 30 minutes to provide a homogenous solution.

After secondary dispersion, the dispersed metal nanoparticles and powdered oxide can be extracted from the passivating solvent. The extraction can be by filtration, centrifugation, removal of the solvents under reduced pressure, removal of the solvents under atmospheric pressure, and the like. After evaporating the passivating solvent, the powdered oxide and metal nanoparticles are left behind on the walls of the reaction vessel as a film or residue. When the powdered oxide is $Al_2O_3$, the film will typically be black. The metal nanoparticle and powdered oxide film can be removed from the reaction vessel and ground to create a fine powder, thereby increasing the available surface area of the mixture. The mixture can be ground with a mortar and pestle, by a commercially available mechanical grinder, or by any other methods of increasing the surface area of the mixture will be apparent to those of skill in the art.

Without being bound by any particular theory, it is believed that the powdered oxide serves two functions during the extraction process. The powdered oxides are porous and have high surface area. Therefore, the metal nanoparticles will settle in the pores of the powdered oxide during secondary dispersion. Settling in the pores of the powdered oxide physically separates the metal nanoparticles from each other, thereby preventing agglomeration of the metal nanoparticles during extraction. This effect is complemented by the amount of powdered oxide used. As noted above, the weight ratio of metal nanoparticles to powdered oxide can be between about 1:10 and 1:15, such as, for example, 1:11, 1:12, 2:25, 3:37, 1:13, 1:14, and the like. The relatively larger amount of powdered oxide in effect serves to further separate or 'dilute' the metal nanoparticles as the passivating solvent is removed. The process thus provides metal nanoparticles of defined particle size.

As will be apparent to those of skill in the art, the catalyst thus prepared can be stored for later use. In another aspect, the metal nanoparticles can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticle and powdered oxide mixture will be apparent to those skilled in the art.

The metal nanoparticles thus formed can be used as a growth catalyst for synthesis of carbon nanotubes, nanofibers, and other one-dimensional carbon nanostructures by a chemical vapor deposition (CVD) process.

The carbon nanotubes can be synthesized using carbon precursors, such as carbon containing gases. In general, any carbon containing gas that does not pyrolize at temperatures up to 800° C. to 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton and xenon or a mixture thereof.

The methods and processes of the invention provide for the synthesis of SWNTs with a narrow distribution of diameters. The narrow distribution of carbon nanotube diameters is obtained by activating small diameter catalyst particles preferentially during synthesis by selecting the lowest eutectic point as the reaction temperature.

In one aspect of the invention, the metal nanoparticles supported on powdered oxides can be contacted with the carbon source at the reaction temperatures according to the literature methods described in Harutyunyan et al., NanoLetters 2, 525 (2002). Alternatively, the metal nanoparticles supported on the oxide powder can be aerosolized and introduced into the reactor maintained at the reaction temperature. Simultaneously, the carbon precursor gas is introduced into the reactor. The flow of reactants within the reactor can be controlled such that the deposition of the carbon products on the walls of the reactor is reduced. The carbon nanotubes thus produced can be collected and separated.

The metal nanoparticles supported on the oxide powder can be aerosolized by any of the art known methods. In one method, the supported metal nanoparticles are aerosolized using an inert gas, such as helium, neon, argon, krypton, xenon, or radon. Preferably argon is used. Typically, argon, or any other gas, is forced through a particle injector, and into the reactor. The particle injector can be any vessel that is capable of containing the supported metal nanoparticles and that has a means of agitating the supported metal nanoparticles. Thus, the catalyst deposited on a powdered porous oxide substrate can be placed in a beaker that has a mechanical stirrer attached to it. The supported metal nanoparticles can be stirred or mixed in order to assist the entrainment of the catalyst in the transporter gas, such as argon.

To evaluate catalyst activity we measured the evolution of hydrogen concentration during carbon SWNTs growth, appeared as a result of catalytic decomposition of hydrocarbon, by using a mass-spectrometer (Thermo Star GSD 300T, with SEM Detector) attached to the outlet of the gas stream of the CVD apparatus. Thus, any changes of catalyst features which influence on catalyst electronic structure and in this manner on hydrocarbon decomposition efficiency and eventually on the kinetics of nanotube growth were detected by monitoring of hydrogen concentration. Analogously, influence of synthesis parameters was also revealed.

Figure 1:
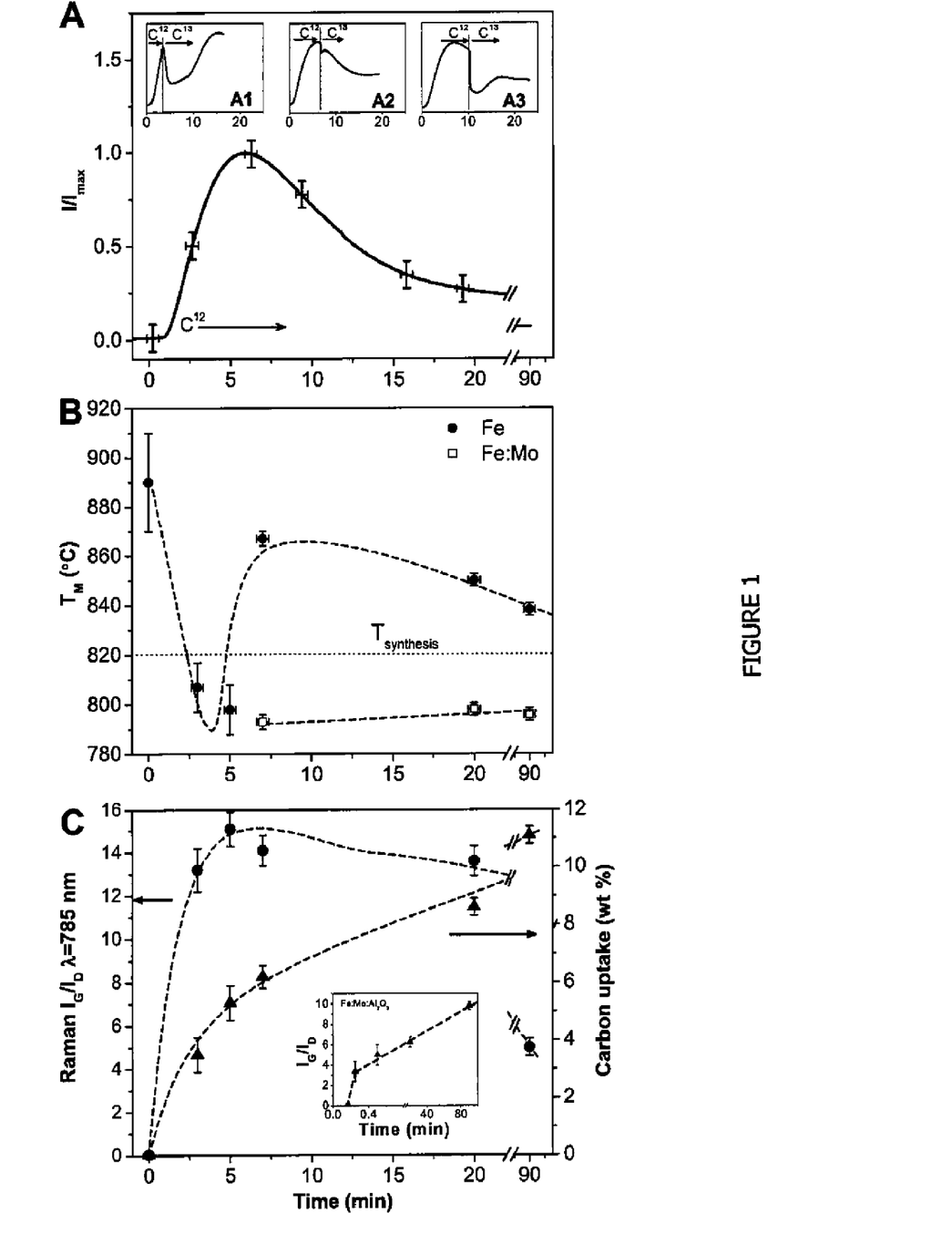
FIG. 1. A) Hydrogen concentration evolution during carbon SWNTs growth Insets (a1) sequential introduction of $C^{12}$ and $C^{13}$ isotopes, respectively for (a1) 3 min and 17 min; (a2) 7 min and 13 min; and (a3) 13 min and 7 min B) Evolution of melting point of Fe catalyst during carbon nanotube growth measured by DSC technique. C) Variation of Raman $I_G/I_D$ intensities ratio and carbon uptake during carbon SWNTs growth FIG. 2. The radial breathing and tangential modes for Raman spectra of carbon SWNTs synthesized by sequential introduction of carbon with $C^{12}$ and $C^{13}$ isotopes FIG. 3. A) Hydrogen concentration evolution at 820° C. for $Al_2O_3$; $Fe:Al_2O_3$ (1:15 molar ratio); $Mo:Al_2O_3$ (0.21:15 molar ratio); and $Fe:Mo:Al_2O_3$ (1:0.21:15 molar ratio) simples B) Time dependence of Raman spectra for carbon SWNTs growth on base of $Fe:Mo:Al_2O_3$ (1:0.21:15) and C) on base of $Fe:Al_2O_3$ (1:15) catalyst
Figure 2:
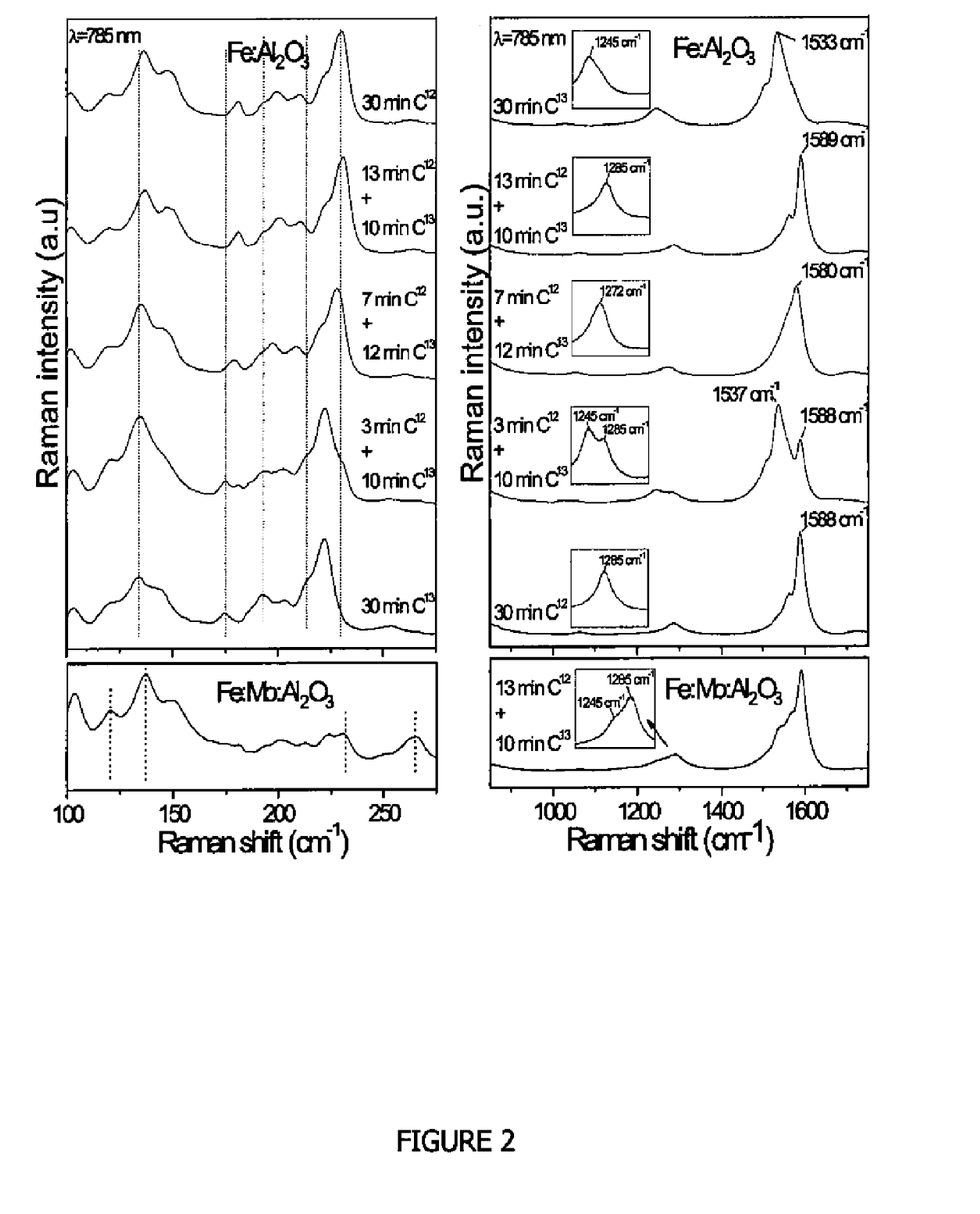

The carbon SWNTs were grown by passing a mixture of methane (60 cm$^3$/min, Praxair, 99.999%) diluted in argon (200 cm$^3$/min) over the Fe catalyst particles (with molar ratio Fe:Al$_2$O$_3$=1:15) at 820° C. for 90 min as described in the literature (A. R. Harutyunyan, B. K. Pradhan, U. J. Kim, G. Chen, P. C. Eklund, Nano Letters, 2, 525 (2002)). The growth of nanotubes was independently confirmed by transmission electron microscopy and Raman measurements. The rapid increase of H$_2$ concentration until t~7±1 min (FIG. 1A) was followed by a slowly return to the almost constant value, which consistent with concentration of non catalytic decomposition of CH$_4$ (FIG. 2A). On the other hand, the DSC studies of the independent samples, synthesized under analogical experimental conditions but different synthesis durations (3; 5; 7; 20 and 90 min), revealed solid-liquid (when t≦7±2 min) and liquid-solid (when t≧20 min) phase transitions of the catalyst induced by carbon atoms diffusion into the catalyst, and formation of Fe—C phases, respectively (FIG. 1B) (H. Kanzow, A. Ding, Phys. Rev. B 60, 11180 (1999); A. R Harutyunyan, E. Mora, T. Tokune Applied Phys. Lett. 87, 051919 (2005)). Comparison of these results (FIGS. 1A and B) shows that the increases of catalyst activity coincidences with liquefaction process of catalyst, while the liquid-solid phase transition initiates deactivation of catalyst. The Raman spectroscopy ($\lambda$=532 nm and 780 nm) studies show dramatic increases of the ratio between the intensities of grown SWNT's G-band and D-band ($I_G/I_D$), which is a measure of the graphitic order in the carbon deposit (H. Cui, G. Eres, J. Y. Howe, A. Puretzky, M. Varela, D. B. Geohegan, D. H. Lowndes, Chem. Phys. Lett. 374, 222 (2003)), in the same t<7 to 10 min interval, where the catalyst is in liquid phase and possess high activity (FIG. 1C), and about 70 wt % of overall carbon yield (wt % carbon relative to the Fe/alumina catalyst) also was gained in the same interval of time. To help establish the relationship between observed evolution of catalyst features and nanotube growth, along with C$^{12}$H$_4$ gas, we use sequential introduction of methane gas with C$^{13}$ isotope (C$^{13}$H$_4$, 99.99%, Cambridge Isotope Lab. Inc.) in the intervals of time when catalyst is liquefied and possess high activity and as well as when catalyst begins to solidify and looses the activity. A series of samples were prepared by using the methane gas C$^{12}$H$_4$ for the first 3 min, 7 min (catalyst still liquefied) and 13 min (catalyst solidified) with following introductions of the C$^{13}$H$_4$ gas for 17 min, 13 min and 7 min respectively (insets in FIG. 1A: A1, A2, A3). Importantly, the Raman spectra of carbon SWNTs obtained by using methane gas with C$^{13}$ isotope is identical to the spectra with C$^{12}$ isotope. The only principal difference is that the Raman shift frequency is $\sqrt{12/13}$ times smaller because the heavier carbon atoms result smaller phonon energies. The Raman spectra for the sample synthesized using the C$^{12}$H$_4$ for the first 3 min with following introduction C$^{13}$H$_4$ for 17 min, contains significant contribution corresponding to the SWNTs with C$^{13}$ atoms, while for the sample feed with C$^{12}$H$_4$ for first 7 min of growth duration and then 13 min with C$^{13}$H$_4$, this contribution decreases (FIG. 2B, C). Finally the spectrum for the sample with 13 min duration of C$^{12}$H$_4$ source and 7 min C$^{13}$H$_4$ is completely identical with the spectrum of nanotubes with only C$^{12}$ isotope. Comparison of these results with catalyst activity and DSC measurements, (FIG. 1A,B,C) allow to conclude, that the liquefied catalyst is favorable for carbon SWNTs growth. Moreover, one of the reasons for growth termination is the solidification of catalyst through the formation of stable carbide phases.

Figure 3:
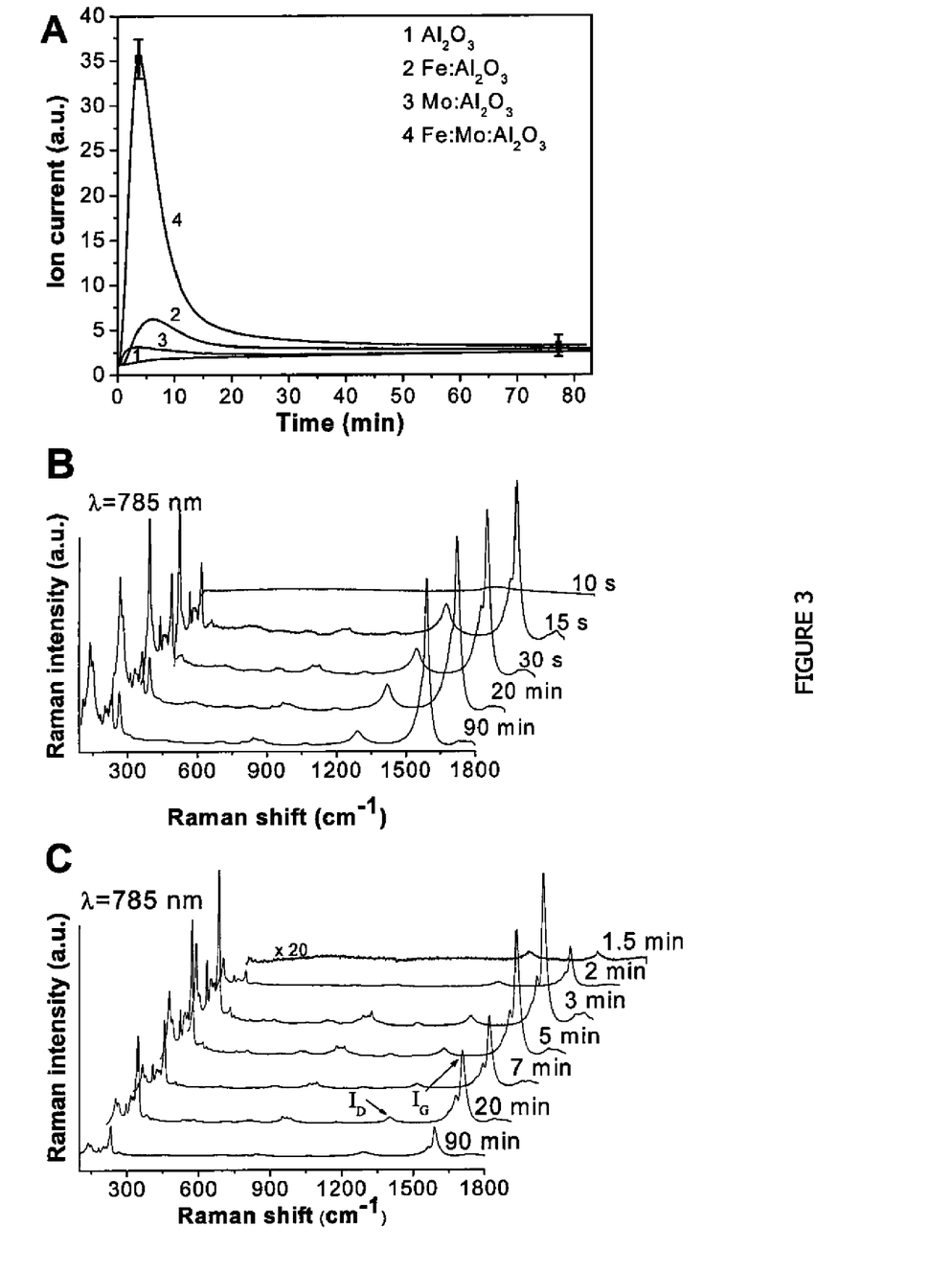

It is known that the addition of Mo to Fe catalyst makes it more efficient for SWNTs production (A-C. Dupuis, Prog. In Materials Science 50, 929-961 (2005); Moisala, A. G. Nasibulin, E. I. Kauppinen, Journ. of Condensed Matter 15, S3011 (2003)). The above described experiments were conducted using Fe:Mo:Al$_2$O$_3$ (with common molar ratio 1:0.21:15) catalyst under analogically synthesis conditions The first distinctive feature observed is that detected activity of Fe:Mo:Al$_2$O$_3$ catalyst was dramatically higher of that for Fe:Al$_2$O$_3$ (FIG. 3A) for during all synthesis duration, and the formation of carbon SWNTs occurs at earlier stages of synthesis (FIG. 3B,C). Second, it is remarkable that the evolution behavior of Fe:Mo:Al$_2$O$_3$ (1:0.21:15) catalyst is qualitatively and quantitatively different compare with mathematical sum of Fe:Al$_2$O$_3$ (1:15) and Mo:Al$_2$O$_3$ (molar ratio 0.21:15) catalysts. This fact was attributed to the intermetallic interaction between Mo and Fe with formation of Fe—Mo alloy. Moreover, DSC measurements show that the catalyst is still in liquid state even for nanotube growth duration up to 90 min (FIG. 1B) and therefore is able to produce nanotubes. Indeed, in contrast to Fe catalyst the Raman spectra for the nanotubes obtained by using Fe/Mo catalyst and sequential introduction of C$^{12}$H$_4$ for 13 min with following introduction of C$^{13}$H$_4$ for 7 min show clear contribution of C$^{13}$ atoms (FIG. 2). However, the catalyst does not show activity when t>30 min (FIG. 3A) and no any contributions from C$^{13}$ atoms were found in the Raman spectra of nanotubes when C$^{13}$H$_4$ was introduced into the reactor following C$^{12}$H$_4$ after t≧20 min. So, even though the catalyst was found liquefied till 90 min it does not results nanotube growth when t≧20 min. This fact attributed to the formation of various form of disordered sp$^2$ carbon (M. S. Dresselhaus, G. Dresselhaus, M. Pimenta, P. C. Eklund, Analytical Applications of Raman Spectroscopy; Pelletier, M., Ed.; 1999, 367) along with nanotube growth, which covers the surface of catalyst and eventually deactivates it. Thus, the addition of Mo importantly prevents the solidification because of carbide formation, and as a result prolongs the catalyst lifetime favorable for nanotube growth almost 2 times.

Even though the catalyst features are favorable for nanotube growth still it is important to know appropriate synthesis conditions. The activity of catalyst was evaluated during synthesis. The variation of synthesis temperature for given other parameters shows that at the temperature ~680° C. the catalyst Fe/Mo can ignite the nanotube growth while in case of pure Fe it requires temperature >720° C. Taking into account that growth of nanotube requires carbon induced liquefaction, the min synthesis temperature is therefore limited by the temperature of eutectic point. Without being bound to theory, this is in agreement also with fact that the addition of Mo decreases the temperature of eutectic point of bulk Fe—Mo—C according ternary phase diagram. On the other hand the thermal decomposition temperature of used particular carbon source limits the synthesis temperature from the supreme. It is obvious that in case of Tsynthesis>830° C., the contribution of carbon atoms formed because of thermal decomposition will be significant and may rapidly poison the catalyst and affect on quality of tubes by coating the catalyst surface and tubes walls, respectively. Finally Tsynthesis>Tmelt (catalyst) results the intermetallic interaction between Fe and Alumina support according to DSC measurements, with further deactivation of catalyst.

Thus, as one can see from FIG. 1B, indeed the liquidus line for supported nanoparticle Fe—C binary phases has a "V-shape" (is not monotonous) dependence on carbon concentration. It is worth to mention that the liquidus lines of corresponding bulk metal-carbon binary phase diagrams of all common catalysts used for nanotube growth have a "V"-shape, which assumes the liquefaction of catalyst due to the carbon diffusion at appropriate temperatures. However, it is crucial that the behavior of liquidus line depends on interfacial interaction energy between nanocatalyst and support material, which became more significant when E>0.1 ev. Moreover, this interaction results significant increasing of melting point/eutectic point for the smaller diameter ≈1 nm. The expressions $$T_{melting} > T_{synthesis} > T_{eutectic} \text{ and } T_{decomp} > T_{synthesis}$$

where $T_{decomp}$ is a thermal decomposition temperature of hydrocarbon, describe the relationship between catalyst features and synthesis parameters favorable for SWNTs growth.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

The invention claimed is:

1. A chemical vapor deposition method for the preparation of single-wall carbon nanotubes (SWNT), the method comprising the steps of:
    providing supported catalyst nanoparticles, wherein the catalyst has a particle size between 1 nm and 10 nm;
    heating the supported catalyst nanoparticles to a temperature below the melting point of the metal phase of the catalyst;
    contacting the supported catalyst nanoparticles with a carbon precursor gas, wherein the carbon precursor gas comprises methane, an inert gas, and hydrogen;
    liquefying the catalyst by contacting the catalyst with the carbon precursor gas;
    forming SWNT by contacting the liquefied catalyst with the carbon precursor gas at a rate equivalent to the rate at which the carbon precursor gas reacts.

2. The method of claim 1, wherein the inert gas is argon, helium, nitrogen, or combinations thereof.

3. The method of claim 1, wherein the catalyst is iron, molybdenum, or combinations of iron and molybdenum.

4. The method of claim 1, wherein the support is a powdered oxide.

5. The method of claim 4, wherein the powdered oxide is selected from the group consisting of $Al_2O_3$, $SiO_2$, MgO and zeolites.

6. The method of claim 5, wherein the powdered oxide is $Al_2O_3$.

7. The method of claim 1, wherein the catalyst and the support are in a ratio of about 1:1 to about 1:50.

8. The method of claim 1, wherein the temperature is about 5° C. to about 150° C. above the eutectic point of the catalyst.

9. The method of claim 8, wherein the temperature is about 10° C. to about 100° C. above the eutectic point of the catalyst.

10. The method of claim 9, wherein the temperature is about 50° C. above the eutectic point of the catalyst.

11. A method for producing a catalyst, the method comprising the steps of:
    providing supported catalyst nanoparticles, wherein the catalyst and the support are in a ratio of about 1:1 to about 1:50 by weight, and the catalyst has a particle size between 1 nm and 10 nm;
    heating the supported catalyst nanoparticles to a temperature below the melting point of the metal phase of the catalyst; and
    liquefying the catalyst by contacting the catalyst with a carbon precursor gas, wherein the carbon precursor gas comprises methane, an inert gas, and hydrogen.

12. The method of claim 11, wherein the support is a powdered oxide.

13. The method of claim 12, wherein the powdered oxide is selected from the group consisting of $Al_2O_3$, $SiO_2$, MgO and zeolites.

14. The method of claim 13, wherein the powdered oxide is $Al_2O_3$.

15. The method of claim 11, wherein the catalyst is iron, molybdenum, or combinations of iron and molybdenum.

* * * * *

UNITED STATES PATENT AND TRADEMARK OFFICE
CERTIFICATE OF CORRECTION

PATENT NO.        : 8,163,263 B2
APPLICATION NO.   : 11/669128
DATED             : April 24, 2012
INVENTOR(S)       : Avetik R. Harutyunyan et al.

It is certified that error appears in the above-identified patent and that said Letters Patent is hereby corrected as shown below:

Title Page, item 56 in the "References Cited" list, insert -- 2002/00178846 A13   12/2002   Dai et al. --.

delete "2002/0017884 A1   2/2002   Ishida".

Signed and Sealed this
Second Day of October, 2012

David J. Kappos
*Director of the United States Patent and Trademark Office*